United States Patent Office 3,325,429
Patented June 13, 1967

3,325,429
METHOD OF PREPARING RUBBER COMPOSITIONS HAVING IMPROVED PHYSICAL PROPERTIES
James Donald Harris, 6 Marlborough Close, Macclesfield, England
No Drawing. Filed May 31, 1966, Ser. No. 553,713
13 Claims. (Cl. 260—23.7)

This application is a continuation-in-part of my copending applications Ser. No. 207,084, filed July 2, 1962, now abandoned, and Ser. No. 274,781, filed Apr. 22, 1963, now abandoned.

This invention relates to rubber compounds and methods of compounding rubber for the purpose of obtaining improved physical properties. It is applicable to natural rubber, and to polyisoprene, polybutadiene, styrene-butadiene, oil extended styrene-butadiene and nitrile rubbers.

According to the invention, rubber is compounded with a reinforcing filler comprising finely divided silicas or silicates, the composition is subjected to heat treatment, and a metallo-organic compound as defined below is added to the heat treated composition.

The metal organic compounds used according to the invention comprise products of reaction between aluminum alkoxides or polyoxo aluminum alkoxides and carboxylic acids, namely polyoxo aluminum stearate, polyoxoaluminum tallate and polyoxo aluminum benzoate.

The metallo-organic compounds further include compounds obtained by condensing alkoxides or aryloxides of trivalent elements with acyloxides of divalent metals or radicals, and compounds obtained by reacting certain metal oxides, e.g. litharge, with polyoxo aluminum acylates. The trivalent elements include especially aluminum and boron, and the alkoxides may be derived from a volatile alcohol such as isopropanol or s-butanol, or the alkoxides or aryloxides may be used in the form of condensed compounds such as polyoxo aluminum alkoxides or aryloxides. The divalent metals and radicals include zinc, calcium, strontium, barium, beryllium, magnesium, cadmium and the zirconyl radical. The acid radicals may be those of one or more carboxylic acids and sulphonic acids, including acetic acid, propionic acid, methacrylic acid, tall oil and tall oil fatty acids, naphthenic acids, synthetic carboxylic acids in the range $C_7$-$C_{24}$, maleic acid, phthalic acid, sebacic acid, azelaic acid and dimerised fatty acids.

Whereas rubber compounds containing finely divided silicas alone as reinforcing fillers are inferior to those containing carbon black in respect of abrasion resistance, modulus, flex resistance and compression set, compounds made according to this invention using silicas have given abrasion resistance, modulus and compression set similar to those obtained with carbon black, together with superior resilience.

The silica, or aluminum, calcium or magnesium silicates may be used in the usual quantities such as 50 parts by weight per hundred parts of rubber.

The metallo-organic compounds may be derived from aliphatic or aromatic acids, and may be used in quantities of 1–20 parts, preferably 3–8 parts, per hundred parts of rubber.

The silica or silicate, may be incorporated with the rubber by means of a mill or internal mixer. The metalloorganic compound is added after heat treatment. Other processing ingredients are added after heat treatment, apart from the antioxidant which is added previously.

The heat treatment may be carried out at temperatures of 100–200° C., preferably 140–180° C., for periods of from 3 minutes at the higher temperatures to 30 minutes at the lower temperatures.

The invention is illustrated by the following examples:

EXAMPLE 1

A compound according to the invention was prepared as follows:

| | Parts by wt. |
|---|---|
| Natural rubber | 100 |
| Finely divided silica | 50 |
| Zinc oxide | 5 |
| Stearic acid | 3 |
| MBTS | 1 |
| DPG | 2 |
| Antioxidant | 1.5 |
| Sulphur | 2.5 |
| Metallo-organic compound | 3 |

(1) A master batch of natural rubber, silica and antioxidant was mixed in an internal mixer. The initial temperature of rotors and case was 50° C., total mixing time was 8 minutes and final temperature was 165° C. The other compounding ingredients were added to this masterbatch on a two roll mill at 60° C.

(2) As 1, but 3 parts, of zinc aluminum tallate was added on the mill at 60° C., followed by the other compounding ingredients.

(3) A compound was mixed entirely on the mill at a temperature of 60–70° C., to the formulation given. The compound was mixed in one operation and zinc aluminum tallate was incorporated.

These three compounds were cured and tested and the following properties obtained. Vulcanisates were cured at 141° C.

Results:

| | 1 | 2 | 3 |
|---|---|---|---|
| Mooney plasticity at 100° C | 70 | 33 | 90 |
| Mooney scorchtime at 120° C. (mins.) | 18 | 23 | 30 |
| Tensile strength (p.s.i.) | 3,800 | 4,140 | 4,020 |
| Modulus at 300% (p.s.i.) | 1,100 | 1,480 | 750 |
| Percent elongation at break | 650 | 600 | 675 |
| Tear strength (p.s.i.) | 2,100 | 2,250 | 2,080 |
| Hardness (B.S. degrees) | 70 | 65 | 75 |
| Abrasion resistance index | 80 | 95 | 65 |
| Percent resilience | 64 | 74 | 55 |
| Percent compression set | 10.4 | 7.0 | 14.5 |
| Flex resistance (kilocycles) | 170 | 200 | 35 |

EXAMPLE 2

*Natural rubber/aluminum silicate*

Formulation:

| | Parts by wt. |
|---|---|
| Natural rubber | 100 |
| Aluminum silicate | 60 |
| Zinc oxide | 5 |
| Stearic acid | 3 |
| MBTS | 0.5 |
| DPG | 1.0 |
| Antioxidant | 1.5 |
| Sulphur | 2.5 |
| Zinc aluminum tallate | 3 |

A masterbatch of the filler and antioxidant in the rubber was prepared in the internal mixer, to the following schedule, starting temperature 75° C., rotor speed 155 r.p.m.

| | Time (minutes) |
|---|---|
| Add premasticated rubber | 0 |
| Add first half of filler+antioxidant | ½ |
| Add second half of filler | 1½ |
| Heat treatment to | 6 |

Final temperature 174° C.

The remainder of the compounding ingredients including the zinc aluminum tallate were added on the mill at 60° C.

This compound A and a second compound B, mixed entirely on the mill and without metal-organic compound, were tested, vulcanising temperature being 141° C.

Results:

|  | A | B |
|---|---|---|
| Mooney plasticity at 120° C. (ML4) | 23 | 56 |
| Mooney scorch time at 120° C. (mins.) | 23 | 146 |
| Tensile strength (p.s.i.) | 3,180 | 3,120 |
| Modulus at 300% (p.s.i.) | 1,680 | 1,320 |
| Percent elongation at break | 500 | 525 |
| Tear strength (p.s.i.) | 1,460 | 1,460 |
| Hardness (B.S. degrees) | 69 | 78 |
| Du Pont abrasion resistance index | 80 | 57 |
| Percent resilience | 72 | 65.5 |
| Percent compression set | 6.9 | 9.6 |

EXAMPLE 3

*Styrene-butadiene rubber/fine particle silica*

Formulation: Parts by wt.

| | |
|---|---|
| Styrene-butadiene rubber (Intol 1502) | 100 |
| Finely divided silica | 50 |
| Zinc oxide | 3 |
| Stearic acid | 1 |
| MBT | 0.5 |
| MBTS | 0.5 |
| DPG | 2 |
| Cumarone indene resin | 3 |
| Antioxidant | 1.5 |
| Sulphur | 2.25 |
| Metal-organic compound | 3 |

Five metal-organic compounds were tested, respectively zinc aluminum tallate, magnesium aluminum tallate, calcium zinc aluminum tallate, zinc aluminum naphthenate and zinc aluminum tallate methacrylate.

Masterbatches of the filler and antioxidant in the polymer were prepared in the internal mixer, starting temperature 75° C., rotor speed 55 r.p.m.

Schedule: Time (mins.)

| | |
|---|---|
| Add SBR | 0 |
| Add first half of filler+antioxidant | 1 |
| Add second half of filler | 2.5 |
| Heat treatment to | 10 |
| Final temperature 180° C. | |

The remainder of the compounding ingredients including the metal-organic compounds were added to the masterbatches on the mill at 50° C.

Five compounds containing the various metal organic compounds were prepared (A–E) and also, a compound mixed entirely on the mill and without metal organic compound. Vulcanising temperature was again 141° C.

|  | A | B | C | D | E | F |
|---|---|---|---|---|---|---|
| Mooney plasticity at 120° C. (ML4) | 52 | 51 | 57 | 57 | 52 | 120 |
| Mooney scorch time at 120° C. (mins.) | 12.0 | 15.7 | 18 | 13.4 | 14.5 | 14 |
| Tensile strength (p.s.i.) | 3,160 | 2,990 | 2,980 | 3,240 | 3,050 | 3,220 |
| Modulus at 300% (p.s.i.) | 1,100 | 1,050 | 910 | 1,000 | 970 | 1,040 |
| Percent elongation at break | 550 | 550 | 575 | 550 | 550 | 600 |
| Tear strength (p.s.i.) | 990 | 900 | 1,120 | 1,110 | 1,040 | 1,100 |
| Hardness (B.S. degrees) | 69 | 71 | 71 | 68 | 68 | 81 |
| Du Pont abrasion resistance index | 112 | 114 | 108 | 114 | 110 | 66 |
| Percent resilience | 62 | 57 | 60 | 60 | 63 | 48 |
| Percent compression set | 8.6 | 5.4 | 5.4 | 6.2 | 8.2 | 21 |

The metal organic compounds used were:
(A) Zinc aluminum tallate.
(B) Magnesium aluminum tallate.
(C) Calcium zinc aluminum tallate.
(D) Zinc aluminum naphthenate.
(E) Zinc aluminum tallate methacrylate.
(F) Nil.

EXAMPLE 4

*Oil extended natural rubber/fine particle silica*

Formulation: Parts by wt.

| | |
|---|---|
| Natural rubber | 80 |
| Naphthenic oil | 20 |
| Fine particle silica | 55 |
| Zinc oxide | 5 |
| Stearic acid | 3 |
| MBTS | 1 |
| DPG | 2 |
| Antioxidant | 1.5 |
| Sulphur | 2.5 |
| Zinc aluminum tallate | 3 |

A masterbatch of the filler and antioxidant in rubber was prepared in the internal mixer, starting temperature 75° C., rotor speed 55 r.p.m.

Schedule: Time (mins.)

| | |
|---|---|
| Add unmasticated rubber | 0 |
| Add first half of filler+antioxidant | 1 |
| Add second half of filler | 2 |
| Heat treatment to | 9 |
| Final temperature 175° C. | |

The rest of the compounding ingredients were added on the mill at 60° C.

This compound, A, and a second compound, B, containing no zinc aluminum tallate and mixed entirely on the mill were tested, vulcanising temperature 141° C.

Results:

|  | A | B |
|---|---|---|
| Mooney plasticity at 120° C. (ML4) | 19 | 50 |
| Mooney scorch time at 120° C. (mins) | 21.6 | 39 |
| Tensile strength (p.s.i.) | 3,150 | 3,050 |
| Modulus at 300% (p.s.i.) | 1,460 | 520 |
| Percent elongation at break | 550 | 750 |
| Tear strength (p.s.i.) | 1,870 | 1,650 |
| Hardness (B.S. degrees) | 61 | 79 |
| Du Pont abrasion resistance index | 102 | 45 |
| Percent resilience | 70 | 44 |
| Percent compression set | 5.1 | 19.3 |

EXAMPLE 5

*Polyisoprene/fine particle silica*

Formulation: Parts by wt.

| | |
|---|---|
| Polyisoprene (Cariflex IR.305 ex Shell Chemical Co. ltd.) | 100 |
| Fine particle silica | 50 |
| Zinc oxide | 5 |
| Stearic acid | 3 |
| MBTS | 1 |
| DPG | 2 |
| Antioxidant | 1.5 |
| Sulphur | 2.5 |
| Zinc aluminum tallate | 3 |

A masterbatch of the filler and antioxidant in the polymer was prepared in the internal mixer, starting temperature 50° C., rotor speed 55 r.p.m.

Schedule:                                          Time (mins.)
   Add premasticated polymer _____ 0
   Add first half of filler+antioxidant _____ 1
   Add second half of filler and circulate steam at 115° C. _____ 2.5
   Heat treatment to _____ 10
   Final temperature was 165° C.

The remainder of the compounding ingredients, were added on the mill at 60° C.

This compound A and another compound B, mixed entirely on the mill and containing no metal organic compound, were tested, vulcanising temperature being 141° C.

Results:

|  | A | B |
|---|---|---|
| Mooney plasticity at 120° C. (ML4) | 28 | 62 |
| Mooney scorch time at 120° C. (mins.) | 45 | 38 |
| Tensile strength (p.s.i.) | 3,420 | 2,900 |
| Modulus at 300% (p.s.i.) | 750 | 430 |
| Percent elongation at break | 800 | 825 |
| Tear strength (p.s.i.) | 1,520 | 920 |
| Hardness (B.S. degrees) | 63 | 74 |
| Du Pont abrasion resistance index | 74 | 60 |
| Percent resilience | 73 | 52 |
| Percent compression set | 6.3 | 11.7 |

EXAMPLE 6

*Polybutadiene/natural rubber blend/fine particle silica*

Formulation:                                        Parts by wt.
   Natural rubber _____ 50
   Polybutadiene (Diene 35) _____ 50
   Fine particle silica _____ 50
   Zinc oxide _____ 5
   Stearic acid _____ 3
   MBTS _____ 1
   DPG _____ 3
   Antioxidant _____ 1.5
   Sulphur _____ 2
   Zinc aluminum tallate _____ 3

A masterbatch of the filler and antioxidant in the polymers was prepared in the internal mixer, starting temperature 50° C.

Schedule:                                          Time (mins.)
   Add premasticated natural rubber _____ 0
   Add polybutadiene _____ ½
   Add first half of filler+antioxidant _____ 2
   Add second half of filler and circulate steam at 115° C. _____ 6½
   Heat treatment to _____ 11
   Final temperature 180° C.

The accelerators, zinc oxide, stearic acid and zinc aluminum tallate were added to the masterbatch at a second stage in the internal mixer and the sulphur was added on the mill.

This compound A and another compound B, prepared on the mill at 85–90° C. and containing no metal-organic compound were tested, vulcanizing temperature 141° C.

Results:

|  | A | B |
|---|---|---|
| Mooney plasticity at 100° C. (ML4) | 55 | 135 |
| Mooney scorch time at 120° C. (mins.) | 35.8 | 12 |
| Tensile strength (p.s.i.) | 2,400 | 2,280 |
| Modulus at 300% (p.s.i.) | 1,100 | 560 |
| Percent elongation at break | 500 | 650 |
| Tear strength p.s.i.) | 1,000 | 1,020 |
| Hardness (B.S. degrees) | 64 | 87 |
| Du Pont abrasion resistance index | 135 | 79 |
| Percent resilience | 69.5 | 54 |
| Percent compression set | 8.0 | 17.4 |

EXAMPLE 7

*Butadiene-acrylonitrile rubber/fine particle silica*

Formulation:                                        Part
   Butadiene-acrylonitrile rubber (Polysar Krynac 802) _____ 100
   Zinc oxide _____ 5
   Stearic acid _____ 1
   MBTS _____ 1.5
   DPG _____ 1
   Fine particle silica _____ 50
   Antioxidant _____ 1.5
   Sulphur _____ 2
   Magnesium aluminum tallate _____ 3

A masterbatch of the filler and antioxidant in the polymer was prepared in the internal mixer, starting temperature 50° C., rotor speed 55 r.p.m.

Schedule:                                          Time (mins.)
   Add polymer _____ 0
   Add first half of filler+antioxidant _____ 1
   Add second half of filler _____ 2½
   Heat treatment to _____ 10
   Final temperature 185° C.

The accelerators, zinc oxide, stearic acid and magnesium aluminum tallate, were added to the masterbatch at a second stage in the internal mixer and the sulphur was added on the mill.

This compound A and another compound, B, prepared in the internal mixer in one stage and containing no metal-organic compound were tested, vulcanizing temperature 141° C.

Results:

|  | A | B |
|---|---|---|
| Tensile strength (p.s.i.) | 3,050 | 3,030 |
| Modulus at 300% (p.s.i.) | 1,620 | 1,160 |
| Percent elongation at break | 475 | 600 |
| Tear strength (p.s.i.) | 1,180 | 1,500 |
| Hardness (B.S. degrees) | 80 | 87 |
| Du Pont abrasion resistance index | 118 | 96 |
| Percent resilience | 45 | 40 |
| Percent compression set | 14.0 | 16.2 |

EXAMPLE 8

*Fine particle silica/natural rubber*

Formulation:                                        Parts by weight
   Natural rubber _____ 100
   Finely divided silica _____ 50
   Zinc oxide _____ 5
   Stearic acid _____ 3
   MBTS _____ 1
   DPG _____ [1] 2
   Antioxidant _____ 1.5
   Sulphur _____ 2.5

[1] 2.25 for compositions mixed in the mill.

Masterbatches consisting of natural rubber, silica and antioxidant in proportions as above, were subjected to the following treatments:

(1) Continuous milling for 20 minutes with the mill rolls at 110° C. followed by addition of 5 parts polyoxo aluminum stearate and the other compounding ingredients at 60° C.

(2) As 1, but 5 parts of zinc stearate were added instead of polyoxo aluminum stearate.

(3) A masterbaatch of the rubber, filler and antioxidant was prepared in the internal mixer to the following schedule, starting temperature 70° C.:

Time (mins.)
Add premasticated rubber _____ 0
Add first half of filler+antioxidant _____ 1
Add second half of filler _____ 2.5
Heat treatment to _____ 8
Final temperature was 175° C.

No metal organic compound was added and the other compounding ingredients were added on the mill at 60° C.
(4) As for 3, but 5 parts of a 70% solution of polyoxo aluminum stearate in mineral oil was added on the mill together with the other compounding ingredients.

These specimens and a specimen 5, not heat treated and without added metal organic compound, were tested and the following properties determined. Vulcanisates were cured at 141° C.

|  | 1 | 2 | 3 | 4 | 5 |
|---|---|---|---|---|---|
| Mooney plasticity at 100° C. (ML4) | 34 | 27 | 65 | 35 | 80 |
| Mooney scorch time at 120° C. (mins.) | 17 | 25 | 18 | 16 | 21 |
| Tensile strength (p.s.i.) | 3,950 | 3,870 | 4,100 | 4,150 | 3,820 |
| Modulus at 300% (p.s.i.) | 1,440 | 1,500 | 1,100 | 1,410 | 800 |
| Percent elongation at break | 600 | 575 | 575 | 550 | 675 |
| Tear strength (p.s.i.) | 2,200 | 2,020 | 2,260 | 2,160 | 2,050 |
| Hardness (B.S. degrees) | 65 | 70 | 72 | 65 | 78 |
| Du Pont abrasion resistance index [1] | 96 | 92 | 70 | 100 | 60 |
| Percent resilience at 20° C. (Dunlop Tripsometer) | 71 | 70 | 63 | 75 | 57 |
| Percent compression set | 7.4 | 7.4 | 8.7 | 7 | 14.3 |

[1] Compared with a standard compound containing channel black, the index of which is 0.

EXAMPLE 9

Natural rubber/aluminum silicate

Formulation: Parts by wt.
- Natural rubber --- 100
- Aluminum silicate --- 50
- Zinc oxide --- 5
- Stearic acid --- 3
- MBTS --- 0.5
- DPG --- 1.0
- Antioxidant --- 1.5
- Sulphur --- 2.5
- 70% soln. polyoxo aluminum stearate in mineral oil --- 5

A masterbatch of the filler and antioxidant in the rubber was prepared in an internal mixer to the following schedule; starting temperature 70° C.

Time (mins.)
- Add premasticated rubber --- 0
- Add first half of filler+antioxidant --- 1
- Add second half of filler and circulate steam at 100° C. --- 2.5
- Heat treatment to --- 8

Final temperature was 155° C.

The remainder of the ingredients including the metal organic compound, were added to the masterbatch on the mill at 60° C.

This compound, A, and a second compound, B, mixed entirely on the mill and without metal organic compound, were tested, vulcanizing temperature being 141° C.

EXAMPLE 10

Styrene butadiene rubber/fine particle silica

Formulation: Parts by wt.
- Styrene butadiene rubber (Intol 1502) --- 100
- Finely divided silica --- 50
- Zinc oxide --- 3
- Stearic acid --- 1
- MBTS --- 1.5
- DPG --- 2.5
- Antioxidant --- 1.5
- Sulphur --- 2
- Metal organic compound --- 5

Two metal organic compounds were compared, respectively 70% solutions of polyoxo aluminum stearate and polyoxo aluminum tallate in mineral oil.

Masterbatches of polymer, filler and antioxidant in the proportions as given were prepared in the internal mixer, using the following schedule, with a starting temperature of 50° C.

Time (mins.)
- Add premasticated polymer --- 0
- Add first half of filler+antioxidant --- 1
- Add rest of filler and circulate steam at a temperature of 115° C. --- 2.5
- Heat treatment to --- 10

Final temperature was 175° C.

The accelerators, zinc oxide, stearic acid and metal organic compounds were added to the masterbatches in the internal mixer, after the heat treatment, with a mixing time of 4 minutes and the sulphur was added on the mill.

Compound A containing 5 p.p.h. polyoxo aluminum stearate and B containing 5 p.p.h. polyoxo aluminum tallate were compared with a third compound C, mixed entirely on the mill to the same formulation but without metal organic compound. Vulcanisates were again cured at 141° C.

|  | A | B |
|---|---|---|
| Mooney plasticity at 100° C. (Ml4) | 36 | 48 |
| Mooney scorch time at 120° C. (min.) | 14.7 | 10 |
| Tensile strength (p.s.i.) | 2,900 | 2,620 |
| Modulus at 300% (p.s.i.) | 1,700 | 1,420 |
| Percent elongation at break | 500 | 500 |
| Tear strength (p.s.i.) | 1,360 | 1,350 |
| Hardness (B.S. degrees) | 68 | 77 |
| Du Pont abrasion resistance index | 78 | 50 |
| Percent resilience | 75 | 70 |
| Percent compression set | 4.8 | 7.0 |

|  | A | B | C |
|---|---|---|---|
| Mooney plasticity at 100° C. (ML4) | 50 | 48 | 110 |
| Mooney scorch time at 120° C. (mins.) | 54 | 50 | 21 |
| Tensile strength (p.s.i.) | 2,860 | 2,600 | 2,550 |
| Modulus at 300% (p.s.i.) | 1,400 | 1,340 | 850 |
| Percent elongation at break | 450 | 450 | 525 |
| Tear strength (p.s.i.) | 790 | 670 | 880 |
| Hardness (B.S. degrees) | 65 | 66 | 84 |
| Du Pont abrasion resistance index | 109 | 108 | 66 |
| Percent resilience | 62 | 62 | 44 |
| Percent compression set | 8.0 | 7.6 | 25.6 |

EXAMPLE 11

*Polyisoprene/fine particle silica*

Formulation:                                    Parts by wt.
    Polyisoprene (Cariflex IR305) _____ 100
    Zinc oxide _____ 5
    Stearic acid _____ 3
    MBTS _____ 1
    DPG _____ 2
    Antioxidant _____ 1.5
    Fine particle silica _____ 50
    Sulphur _____ 2.5
    70% solution polyoxo aluminum stearate _____ 5

A masterbatch of the filler and antioxidant in polymer was prepared in an internal mixer to the following schedule; starting temperature 50° C.

Time (mins.)
Add premasticated polymer _____ 0
Add first half of filler+antioxidant _____ 1
Add remainder of filler and circulate steam at a temperature of 115° C. _____ 2.5
Heat treatment to _____ 10
Final temperature was 165° C.

The rest of the ingredients including the metal organic compound were added to the masterbatch on the mill at 60° C. to make compound A. A second compound, B, was mixed entirely on the mill to the same formulation, but without metal organic compound and the results are given below; vulcanisates were cured at 141° C.

|  | A | B |
|---|---|---|
| Tensile strength (p.s.i.) | 3,420 | 2,900 |
| Modulus at 300% (p.s.i.) | 750 | 430 |
| Percent elongation at break | 800 | 825 |
| Tear strength (p.s.i.) | 1,500 | 920 |
| Hardness (B.S. degrees) | 63 | 74 |
| Du Pont abrasion resistance index | 80 | 60 |
| Percent resilience | 73 | 52 |
| Percent compression set | 6.3 | 11.7 |

EXAMPLE 12

*Polybutadiene/natural rubber blend/fine particle silica*

Formulation:                                    Parts by wt.
    Natural rubber _____ 50
    Polybutadiene (Diene 35) _____ 50
    Fine silica _____ 50
    Zinc oxide _____ 5
    Stearic acid _____ 3
    MBTS _____ 1
    DPG _____ 3
    Antioxidant _____ 1.5
    Sulphur _____ 2
    70% soln. polyoxo aluminum stearate in mineral oil _____ 5

A masterbatch of the filler and antioxidant in the polymers was prepared in the internal mixer to the following schedule, starting temperature 50° C.

Time (mins.)
Add premasticated natural rubber _____ 0
Add polybutadiene _____ ½
Add first half of filler+antioxidant _____ 2
Add second half of filler and circulate steam at a temperature of 115° C. _____ 3.5
Heat treatment to _____ 11
Final temperature was 182° C.

The accelerators, zinc oxide, stearic acid and metal organic compound were added to the masterbatch in the internal mixer after the heat treatment, and the sulphur was added on the mill to make compound A.

Another compound, B, was prepared entirely on the mill at 85–90° C. to the same formulation, but without metal organic compound. Both compounds were tested and results are given below; the vulcanisates were cured at 141° C.

|  | A | B |
|---|---|---|
| Mooney plasticity at 100° C. (ML4) | 60 | 135 |
| Mooney scorch time at 120° C. (mins.) | 6.9 | 10 |
| Tensile strength (p.s.i.) | 2,200 | 2,280 |
| Modulus at 300% (p.s.i.) | 890 | 560 |
| Percent elongation at break | 500 | 650 |
| Tear strength (p.s.i.) | 880 | 1,020 |
| Hardness (B.S. degrees) | 62 | 81 |
| Du Pont abrasion resistance index | 123 | 79 |
| Percent resilience | 75 | 54 |
| Percent compression set | 5.6 | 17.4 |

EXAMPLE 13

*Butadiene-acrylonitrile rubber/fine particle silica*

Formulation:                                    Parts by wt.
    Butadiene-acrylonitrile rubber (Polysar Krynac 801) _____ 100
    Zinc oxide _____ 5
    Stearic acid _____ 3
    MBTS _____ 1.5
    DPG _____ 1
    Fine particles silica _____ 50
    Antioxidant _____ 1.5
    Sulphur _____ 2
    Metal organic compound _____ 3.5

Two metal organic compounds were compared, respectively polyoxo aluminum benzoate and a 70% solution of polyoxo aluminum stearate in mineral oil. Masterbatches of the filler and antioxidant in the polymer were prepared in the internal mixer to the following schedule starting temperature 50° C.

(Time mins.)
Add premasticated polymer _____ 0
Add first half of filler+antioxidant _____ 1
Add rest of filler and circulate steam at 115° C. ___ 2.5
Heat treatment to _____ 10
Final temperature was 190° C.

The accelerators, zinc oxide, stearic acid and metal organic compound were added to the masterbach at the second stage in the internal mixer and the sulphur was added on the mill.

Compound A contained 5 p.p.h. of the 70% solution of polyoxo aluminum stearate in oil, while compound B contained 3 p.p.h. of polyoxo aluminum benzoate. These two compounds were compared with a third compound C which was mixed entirely on the mill to the same formulation but without metal organic compound.

The results are given below. The vulcanisates were cured at 153° C.

|  | A | B | C |
|---|---|---|---|
| Mooney plasticity at 120° C. (ML4) | 66 | 85 | 14 |
| Mooney scorch time at 120° C. (mins.) | 50 | 47 | 9 |
| Tensile strength (p.s.i.) | 3,300 | 3,490 | 3,05 |
| Modulus at 300% (p.s.i.) | 1,410 | 1,650 | 9( |
| Percent elongation at break | 475 | 500 | 57 |
| Tear strength (p.s.i.) | 1,010 | 1,020 | 1,07 |
| Hardness (B.S. degrees) | 78 | 80 | ε |
| Du Pont abrasion resistance index | 200 | 210 | 1( |
| Percent resilience | 38 | 38 | ॽ |
| Percent compression set | 15.6 | 17.3 | 19. |

In all examples an improvement in abrasion resistance modulus at 300%, resilience and compression set was obtained by the use of this process. The process also gav much improved plasticity and resultant improved moul flow was noted.

In each of the examples, the antioxidant used was 2,o methyl cyclohexyl-4,6-dimethyl phenol, but it will b understood that any other suitable antioxidant may b used.

The silica used in the examples was a precipitated type, Manosil VN3 and the aluminum silicate was Manosil MS9.

What is claimed is:

1. A method of preparing rubber compositions comprising compounding approximately 100 parts by weight of rubber selected from the group consisting of natural rubber, polyisoprene, polybutadiene, styrene-butadiene rubber and nitrile rubber, and mixtures thereof with an antioxidant and with approximately 50 parts by weight of a siliceous filler, subjecting the compounded rubber to heat treatment of between 100–220° C. for a period of 5 to 30 minutes, then adding 1–20 parts by weight of an organo metal compound selected from the group consisting of polyoxo aluminum stearate, polyoxo aluminum tallate, polyoxo aluminum benzoate and organo metal compounds containing aluminum, at least one metal selected from the group consisting of zinc, calcium and magnesium, and at least one acid radical derived from an acid selected from the group consisting of tall oil fatty acids, naphthenic acid and methacrylic acid.

2. A method as claimed in claim 1, in which the metallo-organic compounds are used in quantities of 1–10 parts by weight, per hundred parts of rubber.

3. A method as claimed in claim 1, in which the metallo-organic compounds are used in quantities of 3–5 parts by weight per hundred parts of rubber.

4. A method as claimed in claim 1, in which the heat treatment is carried out at temperatures of 100–200° C., for periods of from 7 minutes at the higher temperatures to 30 minutes at the lower temperatures.

5. A method as claimed in claim 4, in which the heat treatment is carried out at temperatures of 140–180° C.

6. A method as claimed in claim 1, in which the rubber is incorporated with the filler and antioxidant and heat treatment is carried out in a rubber processing machine, after which the metal organic compound and other ingredients are mechanically incorporated.

7. The method of claim 1 wherein the addition of the organo metal compound to the heat treated rubber is carried out while maintaining said rubber at a temperature of approximately 60° C.

8. A method of preparing rubber compositions, in which approximately 100 parts by weight of rubber selected from the group consisting of natural rubber, polyisoprene, polybutadiene, styrene-butadiene rubber, nitrile rubber and mixtures thereof is compounded with an antioxidant and with approximately 50 parts by weight of finely divided reinforcing siliceous filler, the composition is subjected to heat-treatment, and there is added to the heat-treated composition 1 to 20 parts by weight of a metallo-organic compound containing aluminum, at least one metal selected from the group consisting of zinc, calcium and magnesium, and at least one acid radical derived from an acid selected from the group consisting of tall oil fatty acids, naphthenic acid and methacrylic acid.

9. A method as claimed in claim 8, in which the metallo-organic compounds are used in quantities of 1–10 parts by weight per hundred parts of rubber.

10. A method as claimed in claim 8, in which the metallo-organic compounds are used in quantities of 3–5 parts by weight per hundred parts of rubber.

11. A method as claimed in claim 8, in which the heat treatment is carried out at temperatures of 100–200° C., for periods of from 7 minutes at the higher temperatures to 30 minutes at the lower temperatures.

12. A method as claimed in claim 11 in which the heat treatment is carried out at temperatures of 140–180° C.

13. A method as claimed in claim 8, in which the rubber is incorporated with the filler and antioxidant and heat treatment is carried out in a rubber processing machine, after which the metal organic compound and other ingredients are mechanically incorporated.

References Cited

UNITED STATES PATENTS

| | | | |
|---|---|---|---|
| 2,451,173 | 10/1948 | Richter et al. | 260—23.7 |
| 2,584,041 | 1/1952 | Nowak et al. | 260—414 |
| 2,715,650 | 8/1955 | Doak | 260—23.7 |
| 2,964,490 | 12/1960 | Howland et al. | 260—41.5 |
| 2,979,497 | 4/1961 | Rinse | 260—2 |

FOREIGN PATENTS

| | | |
|---|---|---|
| 716,631 | 8/1965 | Canada. |
| 943,256 | 5/1966 | Germany. |

OTHER REFERENCES

Gessler et al.: The Reinforcement of Butyl and Other Synthetic Rubbers with Silica Pigments, Rubber Age, October 1955 (p. 73–76).

Rinse: Aluminum Tallate Polymers, reprint from American Paint Journal, May 4, 1959.

DONALD E. CZAJA, *Primary Examiner.*

LEON J. BERCOVITZ, *Examiner.*

R. W. GRIFFIN, *Assistant Examiner.*